Dec. 26, 1950  B. W. HUBBARD  2,535,634
SEAL RING
Filed April 28, 1949
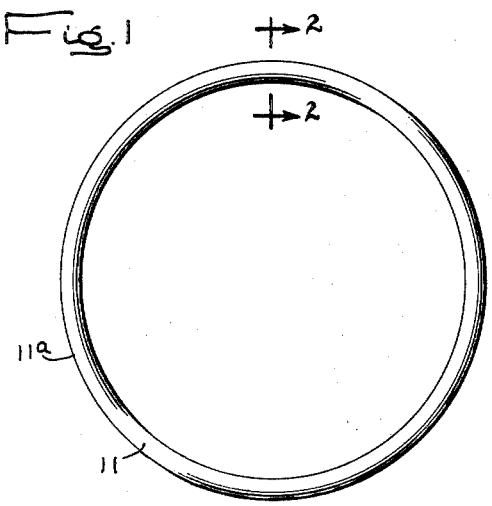
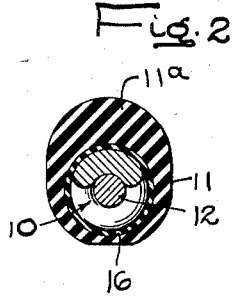
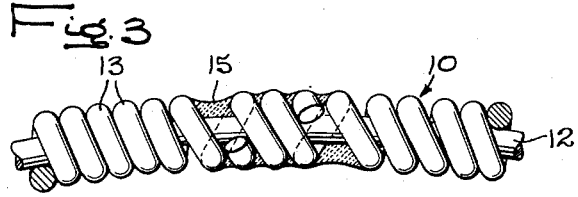
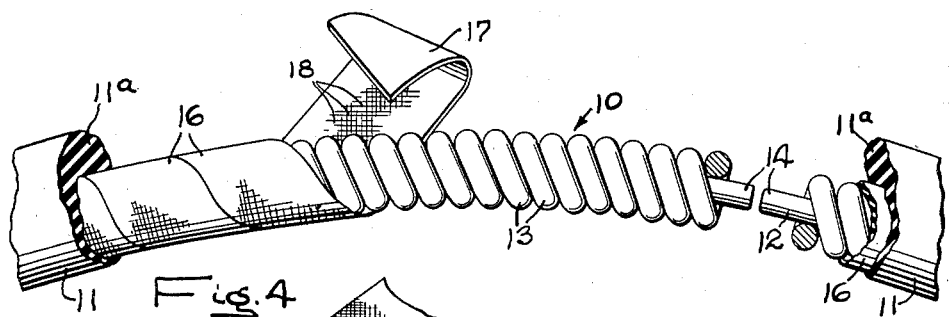
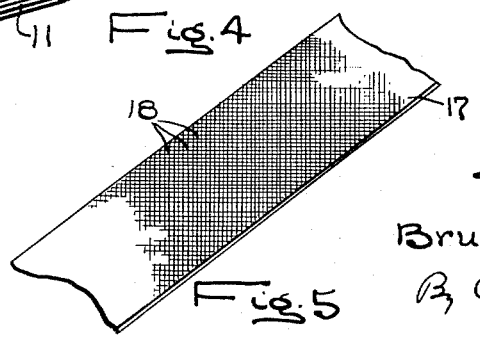
INVENTOR
Bruce W. Hubbard
By Cushman, Pitney, Husband & Wolfe
ATTORNEYS

Patented Dec. 26, 1950

2,535,634

UNITED STATES PATENT OFFICE 2,535,634

SEAL RING

Bruce W. Hubbard, Oak Park, Ill., assignor to Ideal Roller and Manufacturing Company, Chicago, Ill., a corporation of Illinois Application April 28, 1949, Serial No. 90,194

7 Claims. (Cl. 288—11)

This invention relates to rings of resilient material adapted for radial expansion into engagement with a coacting annular part to form a fluid tight seal therewith.

The general object is to provide a seal ring of the above character which is reinforced by metal to withstand the severe centrifugally derived stresses and which at the same time has a soft cushion-like surface to form a tight fluid seal.

A more detailed object is to provide a seal ring of the above character in which a covering of yieldable material encloses and is secured effectually to an annulus comprising a helical coil of wire.

The invention also resides in the novel manner of securing the yieldable covering material to the wire coil.

Other objects and advantages of the invention will become apparent from the following detailed description taken in connection with the accompanying drawings, in which Figure 1 is an elevational view of a seal ring embodying the present invention.

Fig. 2 is a section taken on the line 2—2 of Fig. 1.

Fig. 3 is a fragmentary elevational view of a part of the uncovered ring.

Fig. 4 is an enlarged fragmentary view of the ring with certain of the parts broken away.

Fig. 5 is a fragmentary view of the tape wrapping.

Generally stated, the improved seal ring comprises a radially expansible base ring 10 and a tubular covering 11 for the ring completely enclosing each section of the latter and composed of resilient material such as vulcanized relatively yieldable natural or synthetic rubber or elastomeric material such as so-called vinyl plastisols. The wall of the resilient tube is made thicker on the outer periphery of the ring as indicated at 11a so as to provide the desired yieldability of the ring when expanded radially against a coacting annular part (not shown).

Herein, the base ring 10 includes a core 12 in the form of a wire annulus with its ends 14 disposed substantially in abutment with each other (see Fig. 4). Loosely enclosing the wire 12 is a wire helix 13 wound quite tightly with its opposite end portions wound in overlapping relation as shown in Fig. 3 and secured together as by solder 15, the joint thus formed being located on the side of the ring diametrically opposite from the core ends 14. The ring thus formed is sufficiently rigid to retain a circular shape while being adapted for substantially uniform radial expansion under centrifugal force.

In accordance with the present invention, the yieldable material forming the tube 11 is secured to the base ring in a novel manner such as to preserve the radial expansibility of the ring while avoiding danger of rupturing the covering when the composite ring is rotated at high speed as when the ring is used in a centrifuge. To this end, a layer 16 of material such as flexible plastic or woven fabric is interposed between the metal ring 13 and the rubber tube 11 to which the wrapping becomes bonded integrally during vulcanization of the rubber. The layer 16 is formed by wrapping a strip of the material helically around the wire coil so as to cover the latter completely. Preferably, the adjacent convolutions are disposed in edgewise abutting relation as shown in Fig. 4, thereby making the covering of minimum over-all thickness for a given thickness of the strip. In this way, the wire coil is covered completely so as to prevent flowing of rubber in between the adjacent convolutions of the wire coil. The ends 17 of the wrapping strip may overlap each other or be spliced together as desired so as to complete the enclosure of the coil 13 by the wrapping. Before the strip is applied, the coil 13 or the back of the strip or both may be dusted with powdered graphite or the like to prevent adhesion of the fabric to the coil and thus allow freedom of relative movement between the two during expansion and contraction of the ring in service use. The wrapping, although composed of material which is relatively nonstretchable, will, by virtue of the helical winding of the strip, expand radially with the helical wire coil 13.

It is preferred to employ as the wrapping a finely woven fabric such, for example, as so-called airplane cloth and to cut the fabric on the bias as shown in Fig. 5 so that the threads 18 extend generally perpendicular to the coil 13 as shown in Fig. 4 instead of helically. This enables the tape to be laid around the coil smoothly with no danger of wrinkling so as to leave the fabric exposed at any point after application of the relatively thin rubber coating.

After covering of the coil in the manner described above, the wrapping 16 is covered with unvulcanized rubber material of the required thickness and composition, supported in a mold of the proper cross-sectional shape, and heated to effect vulcanization of the rubber which is thus formed into a solid tube 11 completely enclosing the base ring and integrally united with the fabric wrapping.

In the seal ring which is completed by vulcanization, the rubber tube 11 is reinforced by the tubular wrapping 16 and, through the intermediary of the latter, is fastened so securely to the metal base ring 10 as to be capable of withstanding extreme centrifugal forces without danger of disintegration or rupture of the cushion material 11. At the same time, the tubular covering formed by the helical wrapping 16 and the rubber 11 is adapted to expand and contract radially with the base ring 10. By covering the coil 13 with an impervious wrapping, the soft outer sealing cushion 11a is formed without flowing of any rubber into the coil 13, the expansibility of the latter being thereby preserved.

This application is a continuation-in-part of my copending application Serial No. 732,468, filed March 5, 1947, now abandoned.

I claim as my invention:

1. A seal ring comprising a helically wound coil of wire with its ends interlocking with each other to form a radially expansible and contractible annulus, a ring disposed within said coil and having ends circumferentially separable to permit expansion of the ring with said annulus, a strip of fabric wrapped helically around said annulus to completely cover all parts of the latter while being radially expansible with the annulus, and an integral sleeve of molded resilient material covering said wrapping and bonded thereto.

2. A seal ring comprising a helically wound coil of wire with its ends interlocking with each other to form a radially expansible and contractible annulus, a strip of fabric wrapped helically around said annulus to completely cover all parts of the latter while being radially expansible and contractible with the annulus, and an integral sleeve of molded resilient material covering said wrapping and bonded thereto.

3. A seal ring comprising a helically wound coil of wire connected at its end and forming a radially expansible and contractible annulus, a tape wrapped helically around said annulus to completely cover all parts of the latter while being radially expansible and contractible with the annulus, and an integral sleeve of molded resilient material covering said wrapping and bonded thereto.

4. A seal ring comprising a helically wound coil of wire with its ends connected together to form a radially expansible and contractible annulus, a woven fabric tape wrapped helically around said annulus to completely cover all parts of the latter, the fabric of said tape being cut on the bias so that the threads thereof extend diagonally across the tape and substantially radially around said coil, and an integral sleeve of molded resilient material covering said wrapping and bonded thereto.

5. A seal ring comprising a helically wound coil of wire with its ends connected together to form a radially expansible and contractible annulus, a woven fabric tape wrapped helically around said annulus to completely cover all parts of the latter, the fabric of said tape being cut on the bias so that the threads thereof extend diagonally across the tape, and an integral sleeve of molded resilient material covering said wrapping and bonded thereto.

6. A seal ring as defined by claim 3 in which said tape is an impervious fabric material.

7. A seal ring as defined by claim 3 in which said tape is a fabric separated from the surface of said coil by a coating of powdered material.

BRUCE W. HUBBARD.

REFERENCES CITED

The following references are of record in the file of this patent:

UNITED STATES PATENTS

| Number | Name | Date |
|---|---|---|
| 249,560 | Van Wagenen | Nov. 15, 1881 |
| 404,913 | Johns | June 11, 1889 |
| 1,826,092 | Rice | Oct. 6, 1931 |
| 2,235,523 | Hull | Mar. 18, 1941 |